(12) United States Patent
Vicentelli

(10) Patent No.: US 6,566,992 B1
(45) Date of Patent: May 20, 2003

(54) MODULES CREATING MAGNETIC ANCHORAGE ASSEMBLIES AND RELEVANT ASSEMBLIES

(76) Inventor: Claudio Vicentelli, Località la Scaletta, 07041 Alghero, Sassari (IT)

( * ) Notice: Subject to any disclaimer, the term of this patent is extended or adjusted under 35 U.S.C. 154(b) by 0 days.

(21) Appl. No.: 09/700,761

(22) PCT Filed: Mar. 24, 1999

(86) PCT No.: PCT/EP99/02040

§ 371 (c)(1),
(2), (4) Date: Nov. 20, 2000

(87) PCT Pub. No.: WO99/60583

PCT Pub. Date: Nov. 25, 1999

(30) Foreign Application Priority Data

May 20, 1998 (IT) .......................... MI98A1109

(51) Int. Cl.[7] .................................. H01F 7/20
(52) U.S. Cl. .................. 335/306; 335/285; 335/286; 335/296
(58) Field of Search ....................... 335/285, 286, 335/296–305, 306

(56) References Cited

U.S. PATENT DOCUMENTS

| | | | |
|---|---|---|---|
| 1,535,035 A | | 4/1925 | Philipp |
| 3,041,697 A | * | 7/1962 | Budreck .................. 335/285 |
| 3,196,579 A | * | 7/1965 | Lepper ..................... 446/92 |
| 3,723,927 A | * | 3/1973 | Blakey et al. .............. 335/285 |
| 4,596,971 A | | 6/1986 | Hirabayashi et al. ....... 335/205 |

FOREIGN PATENT DOCUMENTS

| | | |
|---|---|---|
| DE | 39 10304 A1 | 10/1990 |
| EP | 56112705 | 9/1981 |
| FR | 2 301 279 | 9/1976 |
| GB | 726328 | 3/1955 |

\* cited by examiner

*Primary Examiner*—Ramon M. Barrera
(74) *Attorney, Agent, or Firm*—Young & Thompson

(57) ABSTRACT

A module (1, 16, 19, 28, 50, 52, 54, 100) for the creation of assemblies comprising at one active magnetic element of attraction (2, 3, 17, 23, 33, 34, 42, 47, 48) and a least one ferromagnetic element (6, 21, 22, 30, 40, 44) suitable for defining areas (13, 14, 35, 36, 88, 90, 80, 82, 110, 10, 250, 260, 92, 94) for connection to other modules, with it is possible to create an assembly of modules (1, 16, 19, 28, 50, 52, 54, 100, 37, 15) which provides a magnetic circuit which closes totally or at least partially via the ferromagnetic elements present (6, 21 22, 30, 40, 44, 55, 104, 37, 15).

33 Claims, 4 Drawing Sheets

MODULES CREATING MAGNETIC ANCHORAGE ASSEMBLIES AND RELEVANT ASSEMBLIES

BACKGROUND OF THE INVENTION

SUMMARY OF THE INVENTION

The present invention relates to modules which can be coupled to form assemblies which can be used in various technical fields, for example for creating assemblies for games or education, furnishing accessories in the form of ornaments, models of molecule aggregates, patterns, stages, stage-set structures and many other uses.

DESCRIPTION OF THE RELATED ART

Modules in a permanently magnetic material are known and used for single applications and not for the assembly of many modules. These permanent magnet modules are used for example in chess and draughts, whose magnetic pieces rest on a ferromagnetic chessboard, in magnetic boards formed by letters and/or numbers which can be attached magnetically on a ferromagnetic sheet to form texts, and in components of various shapes provided individually with magnets which can be coupled on a ferromagnetic sheet to form two-dimensional figures of animals etc.

These magnetic applications, available on the market, are not based on the coupling of several magnetic modules but simply on the possibility of creating two-dimensional figures, placing the various modules adjacently on a ferromagnetic sheet whereon the single modules are individually short-circuited.

Systems are also known for forming three-dimensional structures which exploit the interlinking of various modules. Modules of various shapes exist, but in general they are prisms with a substantially rectangular plan, formed by a matrix in plastic and by magnetic coupling inserts placed on one or more outline surfaces. The magnetic inserts can be formed by magnetic points with a regular shape, for example square or circular, symmetrically arranged in rows, or by magnetic films with strip magnetisation of alternating polarity.

One of the more serious limits of traditional modules is represented by the fact of having to observe "rules" of assembly which are excessively restrictive and penalising, above all in view of the number of total compositions which can be made.

In respect of the eight faces of the prism which are potentially available for connection, only some of them, and limited to small areas, are effectively active. More particularly two modules with punctiform inserts can at times be connected only if a predetermined number of corresponding rows of magnetic points are superimposed, with the further requisite that these rows of corresponding magnetic points must face each other with opposite magnetic polarity. In other cases connection between the upper face of a module and the lower one of another is possible, but connection between lateral faces or vice versa is excluded. In other cases the connection between faces depends on a predetermined reciprocal positioning of the modules, and it is therefore only possible by overturning one, that is to say by exchanging its upper face with the lower one, the other one remaining unchanged.

Apart from the coupling restrictions, traditional modules are also heavily affected by those caused by the low yield of the magnetic circuit which they originate, i.e. by the percentage of magnetic energy exploited for connection of the modules in relation to the total installed energy.

The high flux dispersion which occurs along the whole magnetic circuit does not enable the installed energy to be exploited in full. This event gains in importance as the complexity of the structure to be built increases, given that assembly of an increasing number of modules causes a gradual accumulation of gaps. In order to obtain composite shapes which are arranged differently but solid, for example cantilevered structures, the magnetic field sources have to be oversized, and the consequent higher need for magnetic material entails a considerable increase in weight of the overall structure and an inevitable increase in costs.

In the case wherein the magnetic inserts are formed by magnetised films with alternating polarity strips, there is additionally the further disadvantage of the fact that the active magnetic area for connection, per coupling surface unit, is very limited and the magnetic material used must necessarily have a low coercive force.

Traditional assembly modules also contribute to the creation of spatial figures which are never magnetically neutral, that is to say spatial figures which can interact appreciably with the surrounding environment and cause situations of real danger. This problem is for example particularly felt in applications for children, where the modules in the form of magnetic bricks can "attract" ferrous materials scattered around, for example needles, pins or nails.

SUMMARY OF THE INVENTION

The object of the present invention is therefore that of providing modules which can be reciprocally attached to form complex assemblies which allow the disadvantages of prior systems to be eliminated.

Another object of the present invention is that of providing assembly modules such as to be rapidly and easily assembled to form a complex assembly and which are also suitable for being disengaged equally easily and rapidly.

Another object of the present invention is that of providing assembly modules which allow extremely stable three-dimensional constructions to be obtained.

According to the invention the foregoing objects are achieved thanks to modules and to their assembly according to any one of the independent claims attached.

In this case assembly defines, for the magnetic flux produced by the magnetic inserts, an appropriate circuit wherein the overall gap, that is to say the amount of the path of the magnetic flux which develops in a non-magnetic material, is only that, required by the possible shape of the modules, by layers with a high friction coefficient or generated by constructional tolerances, which may be created between the two coupling faces of two adjacent modules.

In accordance with the present invention permanently magnetic modules are provided with ferromagnetic yoke and ferromagnetic modules whose combination enables the magnetic flux to be short-circuited completely or at least partially.

The presence of ferromagnetic yokes allows the total number of magnetic modules to be increased as required without thereby increasing at the same rate the overall gap present in the construction.

The magnets which generate the magnetic flux are placed in series and short-circuited by the ferromagnetic yokes in such a way that every additional insertion of modules in the magnetic circuit increases the availability of total coercivity for the structure and consequently contributes to tackling the reluctances which may be present in the magnetic circuit.

Complete use of the magnetic voltages installed allows, on a par with the magnetic material used, a higher force of attraction between the modules.

It is also clear that the short-circuiting which can be achieved by appropriately combining the modules enables, again on a par with the magnetic material used, more flexible and complex structures with unusual shapes to be built, given that the greater force of cohesion considerably increases self-support thereof.

Another diversifying and advantageous aspect is definitely the fact that the permanently magnetic modules with ferromagnetic yoke and the totally ferromagnetic modules are partially or very often totally free of the obligation of being subjected to any predetermined positioning in order to be reciprocally connected and, on the contrary, continuous movement of one module on the other is made possible without interruption.

BRIEF DESCRIPTION OF THE DRAWINGS

These and further advantageous aspects of our invention are made even clearer by reading the description which refers to the accompanying drawings, wherein the sections of ferromagnetic parts are represented by a series of thin oblique lines, the sections of parts of the non-magnetic matrix are represented by a series of alternately thick and thin oblique lines, while the letters n and s denote the north pole and the south pole of a magnet, and the circuit of the magnetic flux is traced by dotted lines.

DESCRIPTION OF THE PREFERRED EMBODIMENT

Figure 1:
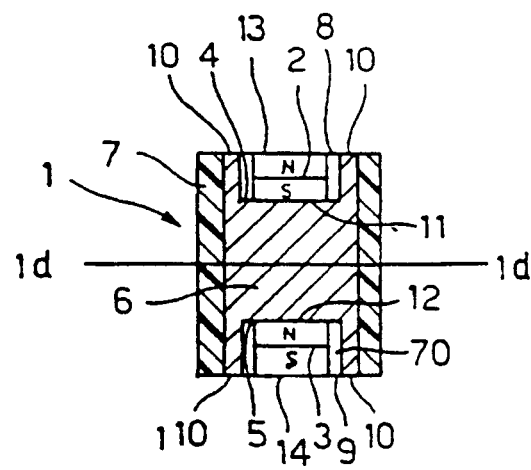
FIGS. 1 and 1d represent sections of permanently magnetic modules according to the present invention, and FIGS. 1a and 1b some possibilities of short-circuiting of the magnetic flux by combining the modules of FIG. 1 one with the other or with ferromagnetic modules.

The permanently magnetic module 1 of FIG. 1 comprises two upper 2 and respectively lower 3 cylindrical magnetic elements housed inside slots 4 and respectively 5, formed on the opposite bases of a cylindrical ferromagnetic yoke 6. The slots 4 and 5 are also cylindrical but more extended radially than the magnets 2 and 3 in order to define an interspace 70 between the lateral walls of the upper and lower magnets 2 and 3 respectively and the lateral walls of the corresponding slots 4 and 5. The magnets 2 and 3 have axes of magnetic polarisation parallel to the axis of the yoke 6 and are connected in series via the ferromagnetic yoke 6.

The core formed by the two magnets 2 and 3 and by the ferromagnetic yoke 6 is integrated in a non-magnetic matrix 7 with a hollow cylinder shape and open at the bases to leave uncovered the polar surfaces 13 and 14 of the magnets 2 and 3 and the upper 10 and lower 110 edges of the ferromagnetic yoke 6 for the connection to other modules.

The use of the module 1 offers the opportunity of making assemblies of two, three or more units with other modules of the same type or with another type of module so as to achieve in any case short-circuiting of the magnetic flux as shown in FIGS. 1a, 1b, 1c and 1d.

Figure 1A:
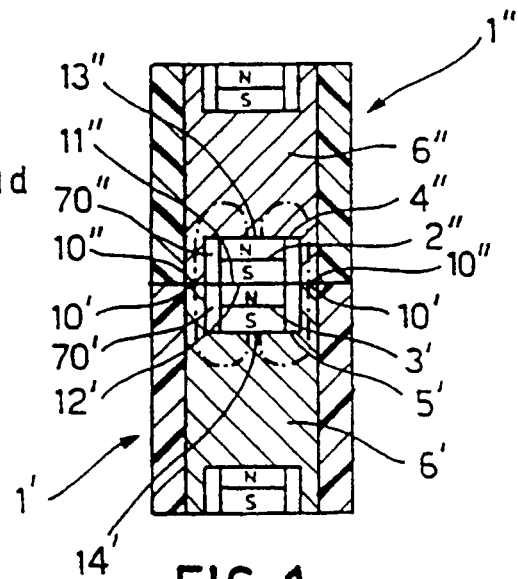

By using two units it is possible to short-circuit the flux by means of the anchorage of two identical modules 1' and 1" wherein the contact magnets 3' and 2" are superimposed with opposite polarity (FIG. 1a). As FIG. 1a also shows, the external polar surfaces 12' and 11" in contact of the modules 1' and 1" represent a first type of directly active areas for the reciprocal connection of the same modules 1' and 1". The upper end edge 10' of the ferromagnetic yoke 6' is polarised by the magnets present both in the module 1' and in the module 1" with which 1' comes into contact, and thus determines a second type of area, this time activated by induction, intended for connection to the module 1". A wholly similar process is simultaneously undergone by the edge 10" of the module 1". The magnetic flux originating from the internal polar surface 13" of the module 1" runs towards the ferromagnetic interior 6" of the same module, deviates towards the edge 10", traverses in succession the edge 10" and then 10' to close finally the magnetic circuit, re-entering from the polar surface 14' of the module 1'. The interspace 70' and 70" respectively eliminates possible short-circuiting of the flux between the lateral walls of the slots 5' and 4" with the lateral walls of the magnets 3' and 2" respectively.

Figure 1B:
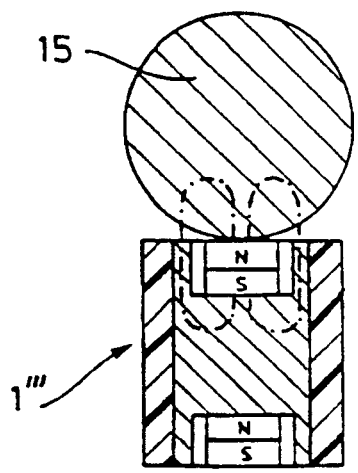

Alternatively a module 1''' can be anchored with a different module, for example a spherical ferromagnetic module 15 (FIG. 1b).

Figure 1C:
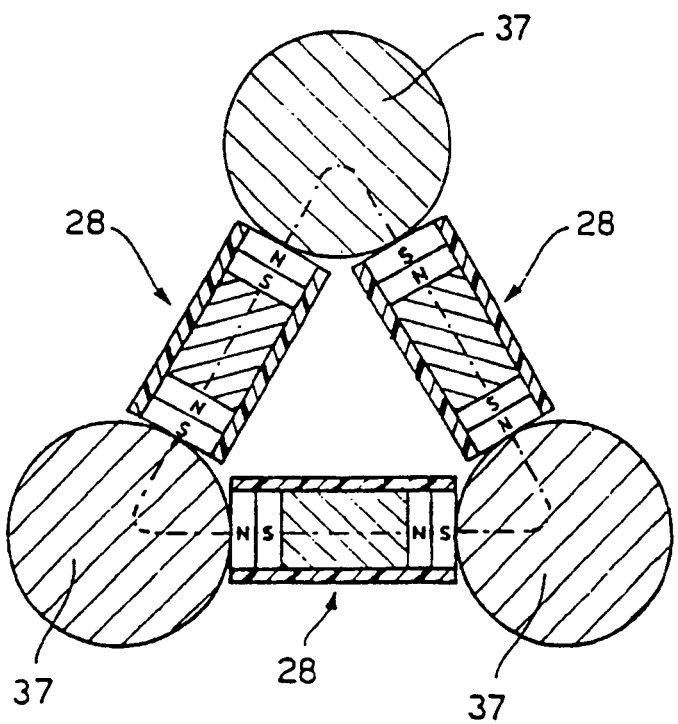
Figure 1D:
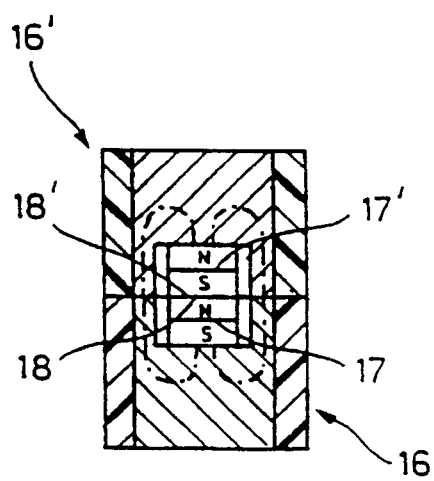

In order to create an assembly, magnetically neutral overall, of two elements alone, in accordance with another preferred embodiment shown in FIG. 1d, modules 16 and 16' with one single magnet 17 and 17', can be used, obtained by imagining shearing module 1 at right angles along the line 1d–1d. In this case the uncovered polar surfaces of opposite sign 18 and 18' of the modules 16 and 16' can engage reciprocally or with a ferromagnetic module.

An assembly of three units wherein a permanently magnetic module 1 is used, can be obtained by anchoring a respective identical module 1 on both faces of coupling 8 and 9, so that all the magnets are in series, or by anchoring, again so that all the magnets are in series, an identical module on one face and a ferromagnetic module, for example spherical, on the other coupling face, or finally by anchoring on the two faces 8 and 9 a respective ferromagnetic module, for example of the spherical type mentioned above.

An assembly of more than three units can be obtained by insertion of the module 1 in a complex of modules which are identical yet arranged with magnets in series and in contact by means of the interposition of ferromagnetic modules of various shapes, although spherical in the present embodiment, in order to create any succession of permanently magnetic and ferromagnetic modules along a closed line which encloses totally the magnetic flux circuit.

Figure 2:
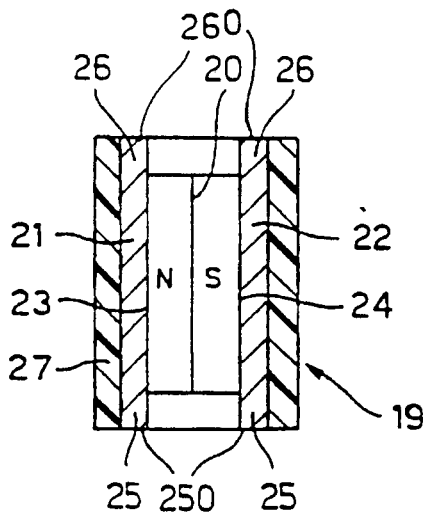
FIGS. 2 and 3 represent sections of other examples of permanently magnetic modules in accordance with the present invention and FIG. 1c a possible short-circuiting of the magnetic flux using modules of FIG. 3 in combination with ferromagnetic modules.

According to a different embodiment the core of another permanently magnetic module denoted by 19 in FIG. 2 is obtained by interposing a magnet 20 between two identical rectangular ferromagnetic sectors 21 and 22 which cover completely the opposite polar surfaces 23 and 24 thereof and which project from the edges of the polar surfaces 23 and 24 so as to define polar extensions 25 and 26. The edges 250 and 260 of the polarised polar extensions 25 and 26 define therefore areas activated by means of induction by the magnet 20 for the magnetic connection to other modules. The core of the module 19 is contained in a non-magnetic coating 27 with prismatic shape and square section which only leaves uncovered the active ferromagnetic areas outlined by the edges of the polar extensions 25 and 26. Polarisation of the magnet 20 is finally at right angles to the axis of the two sectors 21 and 22.

Figure 3:
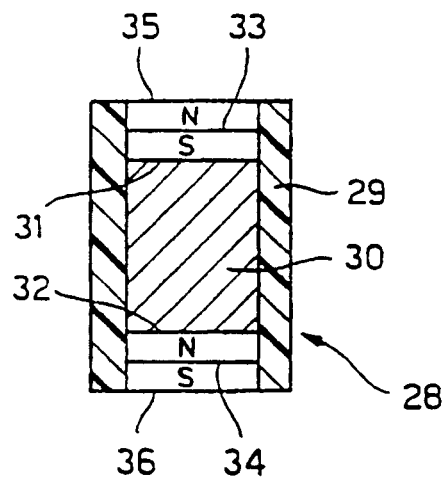

A module 19 allows short-circuiting of the magnetic flux for a minimum structure formed by assembling two units, wherein on one of the two opposite extensions 25 and 26 an identical module or a ferromagnetic module, for example spherical, is anchored, or for a structure composed of at least three units chosen from among modules 19 and ferromagnetic modules, for example spherical, and comprising, accordingly, one, two or three identical permanently magnetic modules 19. In FIG. 3, in accordance with a further preferred embodiment, a permanently magnetic module 28 is represented, housed in a non-magnetic matrix 29 with a prism shape and circular section. The core is formed by a small ferromagnetic cylinder 30 whose opposite bases exactly match the polar surfaces 31 and 32 of opposite sign of two magnets 33 and 34. The two magnets 33 and 34 are magnetised parallel to the axis of the small cylinder 30 and their same uncovered poles 35 and 36 directly define an active area for the connection with other possible modules which in this case is the maximum which can be obtained per unit of surface. With the present embodiment short-circuiting of the magnetic flux is obtained via at least three identical modules 28 arranged with magnets in series, distanced in this case by spherical ferromagnetic modules 37, so as to obtain a triangular structure closed overall, wholly evident in FIG. 1c.

The low flux dispersion which is obtained in the assembling of modules 1, 19 and 28 and the characteristic arrangement in series of the magnets, indicated for example in FIG. 1c, increases the number of design choices and optimises the type and quantity of material to be used for the magnetic elements.

Recalling that the force of cohesion is proportional to the square of the intensity of magnetic flux, it is clear therefore that only one magnetic circuit according to the present embodiments, wherein the ferromagnetic elements 6, 21, 22, 30 and 37 preferentially convey the magnetic flux, can achieve, on a par with the magnets used, a greater force of cohesion between modules or, on a par with the force of cohesion, less need for magnetic material.

The possibility of generating a concentrated force of cohesion with the use of a minimum quantity of magnetic material then reduces as far as possible the gravitational limits in view of a complex and large construction, with reference for example to a stage-set structure, or to a support structure for marquees or stages. In similar circumstances, where human strength is not sufficient for disengaging the modules, it could be foreseen to assign activation and de-activation of the structure to electromagnetic systems wherein a solenoid is fed with current circulating in one or the other direction or mechanical-manual systems for magnetising or demagnetising a part during assembly or disassembly of the structure.

Figure 8:
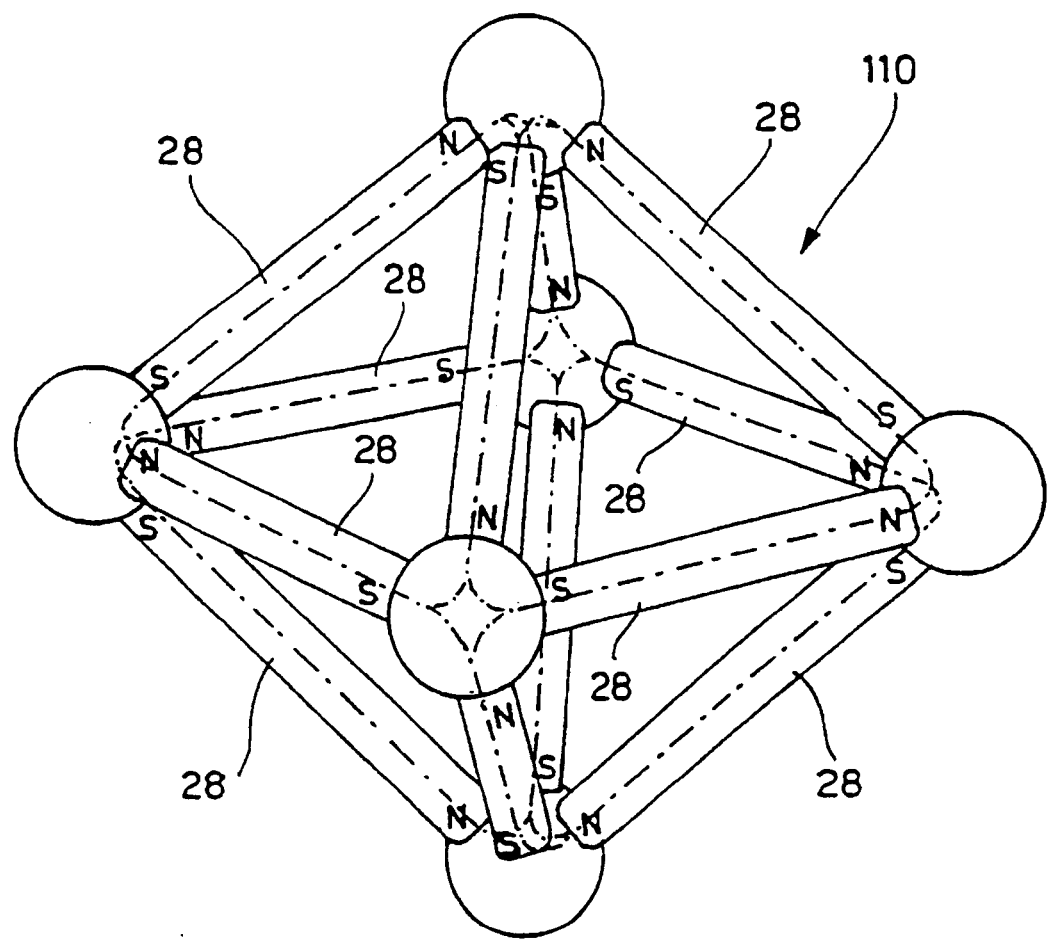
FIG. 8 shows a further assembly according to yet another embodiment of the present invention wherein the resultant structure does not interact magnetically with the external environment.

FIG. 8 gives an example of the form of a possible composition 110 of modules 28 of FIG. 3 with spherical ferromagnetic modules which forms a completely balanced magnetic grid structure, i.e. with a totally short-circuited magnetic flux and with fully combined magnetic voltages, for this reason not interacting in any way with the external environment.

Figure 4:
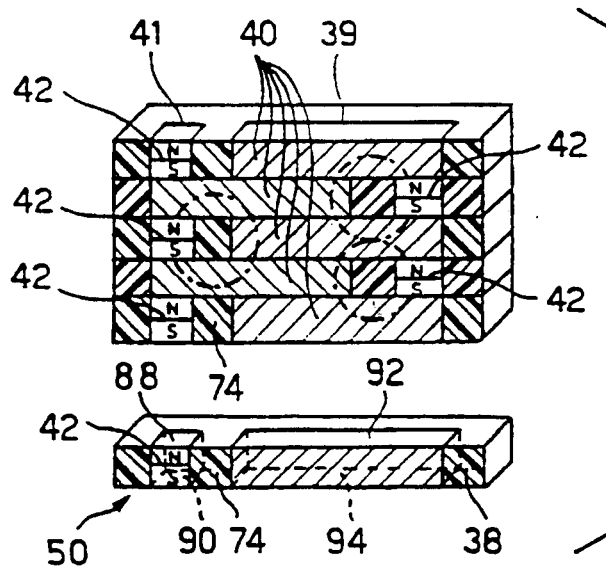
FIGS. 4 and 5 illustrate a section of a single permanently magnetic module and the relevant assemblies according to other embodiments which allow complete short-circuiting of the magnetic flux.

The modules 50 of FIG. 4 are formed by a rectangular plate 38 in a non-magnetic material whereon a first housing 39 is longitudinally formed for a ferromagnetic bar with rectangular plan 40 and a second housing 41 for a rectangular magnet 42 polarised at right angles to the plane of the plate 38. The housing 41 is longitudinally adjacent to the first housing 39 and is placed at one end of the plate 38. The housings 39 and 41 for the bar 40 and for the magnet 42 have a depth equal to the whole thickness of the plate 38. The uncovered polar surfaces 88 and 90 formed by the upper and lower bases of the magnet 42 and the upper 92 and lower 94 surfaces respectively of the bar 40 represent directly active areas and respectively areas activated by magnetic induction for magnetic connection with adjacent modules.

Figure 5:
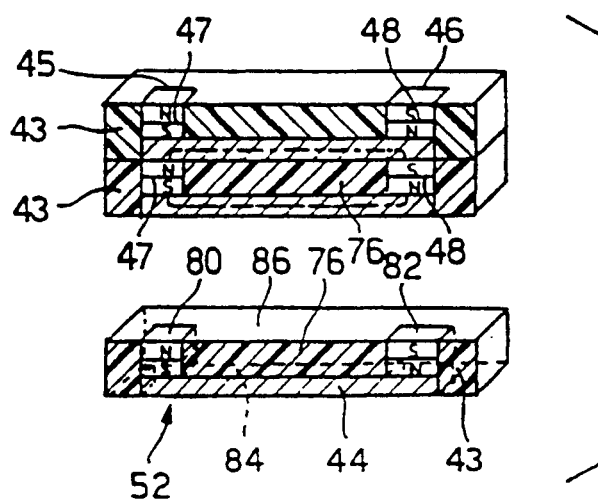

The modules 52 of FIG. 5 are also formed by a plate 43 in non-magnetic material on the lower lateral wall 84 whereof a first housing is longitudinally formed, with depth equal to approximately half the thickness of the plate, for a ferromagnetic element 44 in the form of a bar with a rectangular plan. A second 45 and a third 46 housing for two identical magnets 47 and 48, with however opposite direction of magnetisation, are provided on the upper lateral wall 86 of the plate 43 at the opposite ends of the ferromagnetic element 44 so as to leave uncovered only the polar surfaces 80 and 82 of the two magnets 47 and 48.

FIGS. 4 and 5 also show by a dotted line how perfect short-circuiting of the flux is achieved, during the operation of assembly of the modules 50 and 52, which traverses the sections of the ferromagnetic elements 40 and 44. More particularly the non-magnetic layer 74 longitudinally separating the bar 40 from the magnet 42 and the non-magnetic layer 76 which divides the two magnets 47 and 48 allows the flux emerging from a pole of the magnet 42 and 47 respectively to close on the remaining pole of opposite sign and respectively on the pole of opposite sign of the magnet 48 only after having traversed the sections of the ferromagnetic bars 40 and 44 respectively of the adjacent modules 50 and 52 respectively.

Given that the modules 50 and 52 shown in FIGS. 4 and 5 have available, compared to any other solution known today, greater energy for achieving reciprocal engagement, the need for embodiments with dimensioning inside with extremely narrow tolerances is reduced.

It is therefore possible to cover with a layer of non-magnetic material the polar surfaces of coupling of the magnets 42, 47 and 48 and the uncovered surfaces of the ferromagnets 40 and 44 for purely aesthetic needs and for hygiene purposes, and to increase the forces of friction between the various modules 50 and 52.

More particularly it can thus be derided to apply to a core comprising one or more magnets and a ferromagnetic yoke or to a solely ferromagnetic core a non-magnetic coating to form a module of the required shape, for example bar, cubic, octagonal and so on.

The complete non-magnetic covering of the core also avoids, in the applications for children, the risk of saliva contact directly with the magnetic and/or ferromagnetic material.

When creating three-dimensional structures, particularly in heavier and more complex structures, the overall stability is governed not only by the force of cohesion but also by the force required for the sliding of two coupling surfaces. Thus part of the cohesion force, extremely high for what has been said in the present embodiment, can be sacrificed by covering the module with a thin layer of material with a high friction coefficient which, in view of an expected increase in the reluctance of the magnetic circuit, offers as a compensation a distinct improvement in the sliding force.

Figure 6:
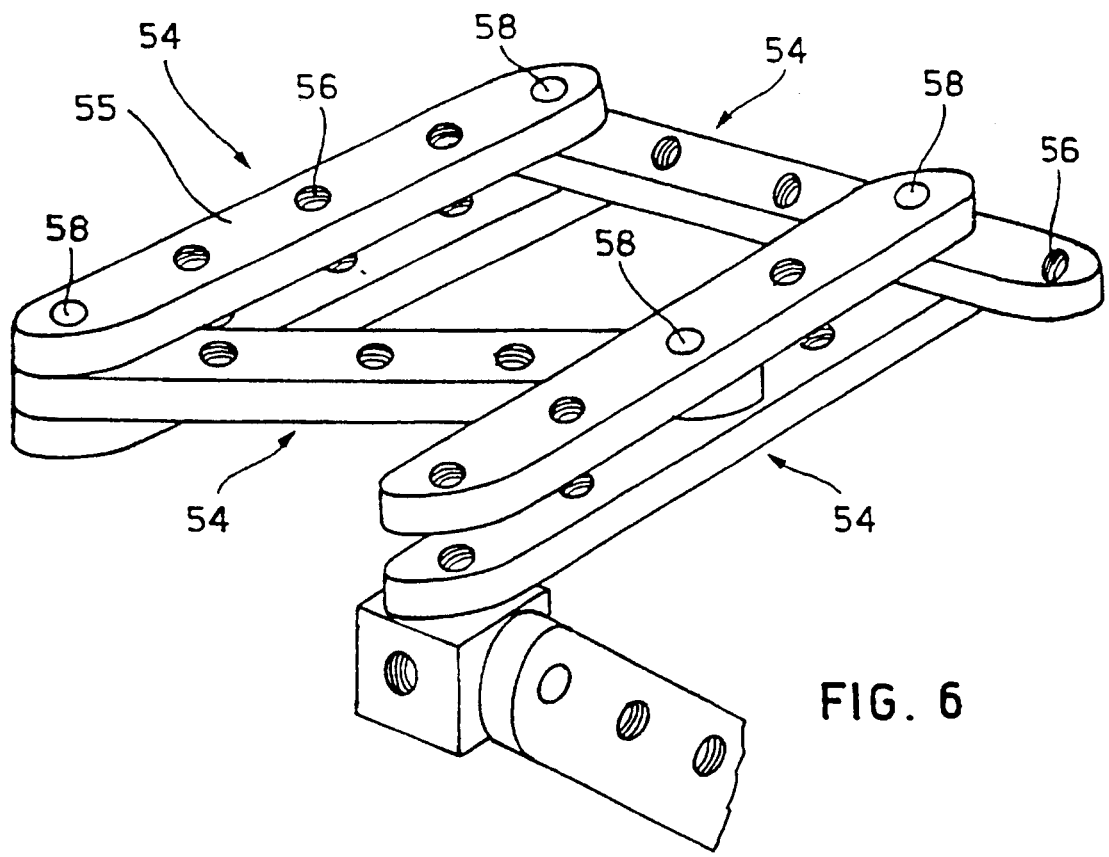
FIG. 6 illustrates an assembly, according to a possible embodiment of the present invention, wherein the magnetic elements of a module are removable.

The assembly of FIG. 6 has modules 54 with an elongated ferromagnetic element 55 wherein through holes 56 are formed in a longitudinal sequence for housing magnets 58. In this example the holes allow engaging and disengaging of magnets having nonmagnetic threading, a part or all of which can therefore be inserted or removed from the holes 56 as required.

The embodiment in a removable engagement module, by appropriate male/female coupling parts, of ferromagnetic elements and active magnetic elements, one with the other and with the non-magnetic matrix which may be present, would naturally be possible in general also for any one of the modules described previously or for any other module in accordance with the present invention.

Figure 7:
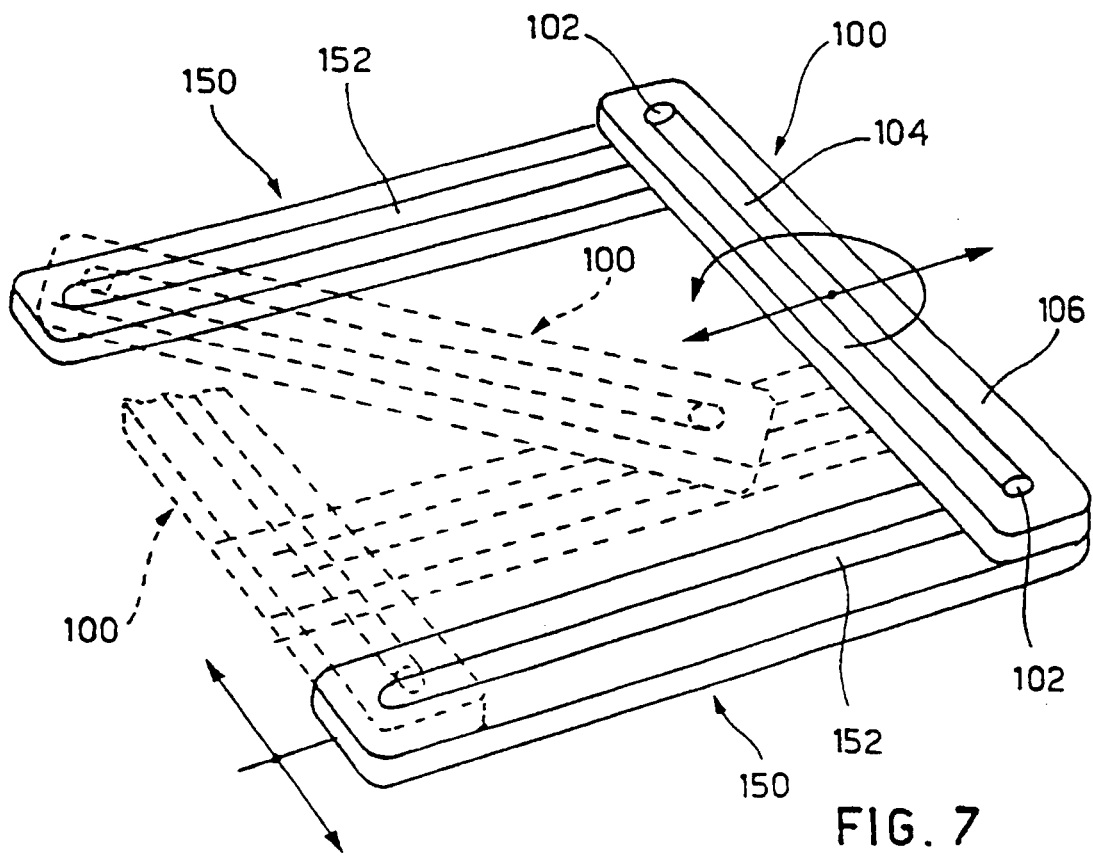
FIG. 7 illustrates another assembly according to a further embodiment of the present invention wherein it is possible to move one module on another with continuity.

The assembly of FIG. 7 comprises modules 150 with a totally ferromagnetic core 152, and modules 100 with a permanently magnetic core 102 of the type for example shown in FIG. 1d, provided at the opposite ends of a ferromagnetic yoke 104, in turn elongated longitudinally and inserted in a non-magnetic bar 106.

The presence of ferromagnetic parts in the units 100 allows the flux to be conveyed without high dispersions, but above all it avoids the obligation of appropriately positioning the units 100 one in respect of the other as indicated by the arrows which give an example of the possible relative displacements between modules, thus increasing the number of shapes which can be achieved, given that each ferromagnetic portion of a unit 100, and not only the polar surfaces of a magnet 102, can provide points for the magnetic connection with other units 100.

The broad constructional tolerances which can be conceived with assemblies of modules in accordance with the present embodiments also open up to the use of non-magnetic materials for environment-friendly coverings such as wood, given that such precise machining operations, as currently performed, are not required, above all pressure dire-casting of plastic, and therefore makes way for applications also in the field of furnishing in addition to the typical one of games.

It must be understood that the preferred embodiments do not limit the more general principle claimed.

More particularly the same principle can also be extended to modules with different shapes from those described in the preferred embodiments and obtained by integrating one or more active magnetic elements and/or one or more of the modules described above in a single unit, completely ferromagnetic, represented for example by part of the embodiment of FIG. 6 denoted by 55, or partially ferromagnetic represented for example by the ferromagnetic 104 and non-magnetic 106 parts of the embodiment of FIG. 7.

The magnets moreover can if necessary be scattered according to a predetermined arrangement on one or also on several outline faces of the non-magnetic matrix and the latter can at most have a polyhedral structure with many faces.

What is claimed is:

1. An assembly comprising:
   a plurality of a first type of modules (1, 19, 28, 50, 52, 54), each of said first type of nodules (1, 19, 28, 50, 52, 54) comprising at least one active magnetic element (2 and 3, 20, 33 and 34, 42, 47 and 48, 58) having two polar surfaces of opposite polarity, and at least one ferromagnetic element (6, 21 and 22, 30, 40, 44, 55), the at least one active magnetic element and ferromagnetic element of each said first type of module being arranged to define at least two magnetically active areas, each of which can be magnetically anchored co a corresponding said magnetically active area of another said first type of module, so that a plurality of said first types of modules can be chained together infinitely, to construct an assembly defining a magnetic circuit;
   wherein a magnetic flux generated by the active magnetic elements in the assembly is short circuited at least partially via said at least one ferromagnetic element (6, 21 and 22, 30, 40, 44, 55);
   wherein the magnetic flux generated by the magnetic potential differences of the active magnetic elements (2 and 3, 20, 33 and 34, 42, 47 and 48, 58) in a series connection of said modules of a first type of modules (1, 19, 28, 50, 52, 54) produces a series magnetic circuit extending through the series connection of said first type of modules; and
   wherein the first type of modules of the assembly are assembled so that said magnetic circuit provides the best magnetomotive force/magnetic reluctance ratio.

2. A module of a first type of modules (1, 28, 50, 52, 54) comprising at least one active magnetic element (2 and 3, 33 and 34, 42, 47 and 48, 58), that is an element having two polar surfaces of opposite polarity, and at least one ferromagnetic element (6, 30, 40, 44, 55) for an assembly according to claim 21, characterized in that it has an elongated structure along which said at least an active magnetic element (2 and 3, 33 and 34, 42, 47 and 48, 58) and said at least one ferromagnetic element (6, 30, 40, 44, 55) are arranged, and in that it defines at least two magnetically active areas whereto corresponding modules of the assembly can be anchored.

3. A module of a first type of modules according to claim 2, characterized in that said at least two magnetically active areas (35,36) are all provided by said at least one active magnetic element (33,34).

4. A module of a first type of modules according to claim 2, characterized in that said at least two magnetically active areas (250,260) are all provided by said at least one ferromagnetic element (21,22).

5. A module of a first type of modules according to claim 2, characterized in that a part (88,90) of said at least two magnetically active areas is provided by said at least one active magnetic element (42), and a part (92,94) by said at least one ferromagnetic element (40).

6. A module according to claim 2, characterized in that it consists of one ferromagnetic element in the form of an elongated cylindrical ferromagnetic yoke (6,30) and of two active magnetic elements in the form of an upper cylindrical magnet (2, 33) and a lower cylindrical magnet (3, 34), said upper magnet (2, 33) and lower magnet (3, 34) being connected in series by the interposition of said cylindrical yoke (6,30).

7. A module according to claim 6, characterized in that at the upper and lower bases of said yoke (6) an upper (4) and respectively lower (5) slot is formed for housing said upper (2) and respectively lower (3) magnets, the lateral walls of said upper (4) and lower (5) slots being provided distanced from the lateral walls of said upper (2) and respectively lower (3) magnets.

8. A module of the first type according to claim 2, characterized in that it consists of two ferromagnetic elements in the form of a first (21) and a second (22) rectangular ferromagnetic sector, and of one active magnetic element in the form of a rectangular magnet (20) whose two polar surfaces (23, 24) are totally covered by a wall of said first sector (21) and the other by a wall of said second ferromagnetic sector (22), and said first (21) and second (22) sectors projecting from said polar surfaces (23, 24) in the direction orthogonal to the axis of polarization of the rectangular magnet (20).

9. A module of the first type for an assembly according to claim 2, characterized in that it consists of one ferromagnetic element in form of one substantially rectangular ferromagnetic bar (40), and of one magnetic active element in form of one a magnet (42), also rectangular, which has equal thickness in relation to the ferromagnetic bar (40) and which is separated longitudinally from the bar (40) by a layer of non magnetic material, said magnet being polarized perpendicularly to the longitudinal extension of the module.

10. A module according to claim 2, characterized in that it consists of one ferromagnetic element in the form of a substantially rectangular ferromagnetic bar (44) and of two magnetic active elements in form of a first (47) and a second (48) substantially rectangular magnet polarized perpendicularly to the longitudinal extension of the module and arranged with opposite polarization above the opposite ends of the ferromagnetic element (44) in order to be connected in series via said ferromagnetic element (44).

11. A module according to claim 2, characterized in that it consists of one ferromagnetic element in form of an elongated ferromagnetic integration unit (55) and of a plurality of magnetic active elements in form of a plurality of longitudinally aligned magnets (58) inserted in corresponding housing (56) provided along the length of said integration unit (55), said plurality of longitudinally aligned magnets (58) being polarized perpendicularly to the longitudinal axis of the elongated ferromagnetic integration unit (55).

12. A module according to claim 2, characterized in that a removable engagement is provided between said at least one magnetic active element (2 and 3, 33 and 34, 42, 47 and 48, 58) and said at least one ferromagnetic element (6, 30, 40, 44, 55).

13. A module according to claim 12, characterized in that a removable engagement is further provided between said at least one ferromagnetic element (6, 30, 40, 44, 55) and a non magnetic matrix (7, 29, 74, 76, 106) wherein said at least one active magnetic element (2 and 3, 33 and 34, 42, 47 and 48, 58) and said at least one ferromagnetic element (6, 30, 40, 44, 55) are inserted.

14. A module for the creation of assemblies according to claim 12, characterized in that said removable engagement is formed with mechanical engaging parts of the male/female type.

15. An assembly resulting from a combination of predetermined number of modules according to claim 12, characterized in that it defines a means for a game activity or a furnishing accessory or a means for creating stage-set structures.

16. A module of a second type of modules (15, 37) consisting of one ferromagnetic element (15, 37) for an assembly according to claim 1, characterized in that said one ferromagnetic element is a sphere (15, 37).

17. An assembly comprising:
a plurality of a first type of module (1, 19, 28, 50, 52, 54) comprising at least an active magnetic element (2 and 3, 20, 33 and 34, 42, 47 and 48, 58) having two polar surfaces of opposite polarity, and at least one ferromagnetic element (6, 21 and 22, 30, 40, 44, 55), a plurality of a second type of module (15,37) consisting of one ferromagnetic element inserted in a non magnetic covering matrix, wherein the assembly defines a magnetic circuit in which each of the modules of the first and of the second type defines at least two magnetically active areas, each of which can be magnetically anchored to a corresponding said magnetically active area of another module of the first or second type, so that the first and second types of modules can be chained together infinitely;

wherein a magnetic flux generated by the active magnetic elements of the assembly (2 and 3, 20, 33 and 34, 42, 47 and 48, 58) is closed at least partially via said at least one ferromagnetic element (6, 21 and 22, 30, 40, 44, 55) of said modules of a first type of modules (1, 19, 28, 50, 52, 54) and via said one ferromagnetic element (15,37) of said modules of a second type of modules (15,37);

wherein magnetic potential differences produced in said magnetic circuit by the active magnetic elements (2 and 3, 20, 33 and 34, 42, 47 and 48, 58) involved in anchorage of said modules of a first (1, 19, 28, 50, 52, 54) and second (15,37) type of modules are connected together in series via said at least one ferromagnetic element of said first type of modules and via said one ferromagnetic element of said modules of the second type; and wherein the modules of the assembly are assembled so that said magnetic circuit provides the best magnetomotive force/magnetic reluctance ratio.

18. A module of a second type of modules (15,37) consisting of one ferromagnetic element (15,37) for an assembly according to claim 17, characterized in that said one ferromagnetic element is a sphere (15,37).

19. A module of a first type of modules (1, 28, 50, 52, 54) comprising at least one active magnetic element (2 and 3, 33 and 34, 42, 47 and 48, 58), that is an element having two polar surfaces of opposite polarity, and at least one ferromagnetic element (6, 30, 40, 44, 55) for an assembly according to claim 22, characterized in that it has an elongated structure along which said at least an active magnetic element (2 and 3, 33 and 34, 42, 47 and 48, 58) and said at least one ferromagnetic element (6, 30, 40, 44, 55) are arranged, and in that it defines at least two magnetically active areas whereto corresponding modules of the assembly can be anchored.

20. A module of a first type of modules according to claim 19, characterized in that said at least two magnetically active areas (35, 36) are all provided by said at least one active magnetic element (33, 34).

21. A module of a first type of modules according to claim 19, characterized in that saved at least two magnetically active areas (250, 260) are all provided by said at least one ferromagnetic element (21, 22).

22. A module of a first type of modules according to claim 19, characterized in that a part (88, 90) of said at least two magnetically active areas is provided by said at least one active magnetic element (42), and a part (92, 94) by said at least one ferromagnetic element (40).

23. A module according to claim 19, characterized in that it consists of one ferromagnetic element in the form of an elongated cylindrical ferromagnetic yoke (6, 30) and of two active magnetic elements in the form of an upper cylindrical magnet (2, 33) and a lower cylindrical magnet (3, 34), said upper magnet (2, 33) and lower magnet (3, 34) being connected in series by the interposition of said cylindrical yoke (6, 30).

24. A module according to claim 23, characterized in that at the upper and lower bases of said yoke (6) an upper (4) and respectively lower (5) slot is formed for housing said upper (2) and respectively lower (3) magnets, the lateral walls of said upper (4) and lower (5) slots being provided distanced from the lateral walls of said upper (2) and respectively lower (3) magnets.

25. A module of the first type according to claim 19, characterized in that it consists of two ferromagnetic elements in the form of a first (21) and a second (22) rectangular ferromagnetic sector, and of one active magnetic element in the form of a rectangular magnet (20) whose two polar surfaces (23, 24) are totally covered by one a wall of said first sector (21) and the other by a wall of said second ferromagnetic second (22), and said first (21) and second (22) sectors projecting from said polar surfaces (23, 24) in the direction orthogonal to the axis of polarization of the rectangular magnet (20).

26. A module of the first type for an assembly according to claim 19, characterized in that it consists of one ferromagnetic element in the form of one substantially rectangular ferromagnetic bar (40), and of one magnetic active element in the form of one a magnet (42), also rectangular, which has equal thickness in relation to the ferromagnetic bar (40) and which is separated longitudinally from the bar (40) by a layer of non magnetic material, said magnet being polarized perpendicularly to the longitudinal extension of the module.

27. A module according to claim 19, characterized in that it consists of one ferromagnetic element in the form of a substantially rectangular ferromagnetic bar (44) and of two magnetic active elements in the form of a first (47) and a second (48) substantially rectangular magnet polarized perpendicularly to the longitudinal extension of the module and arranged with opposite polarization above the opposite ends of the ferromagnetic element (44) in order to be connected in series via said ferromagnetic element (44).

28. A module according to claim 19, characterized in that it consists of one ferromagnetic element in the form of an elongated ferromagnetic integration un,it (55) and of a plurality of magnetic active elements in the form of a plurality of longitudinally aligned magnets (58) inserted in corresponding housing (56) provided along the length of said integration unit (55), said plurality of longitudinally aligned magnets (58) being polarized perpendicularly to the longitudinal axis of the elongated ferromagnetic integration unit (55).

29. A module according to claim 19, character; zed in that a removable engagement is provided between said at least one magnetic active element (2 and 3, 33 and 34, 42, 47 and 48, 58) and said at least one ferromagnetic element (6, 30, 40, 44, 55).

30. A module according to claim 29, characterized in that a removable engagement is further provided between said at least one ferromagnetic element (6, 30, 40, 44, 55) and a non magnetic matrix (7, 29, 74, 76, 106) wherein said at least one active magnetic element (2 and 3, 33 and 34, 42, 47 and 48, 58) and said at least one ferromagnetic element (6, 30, 40, 44, 55) are inserted.

31. A module for the creation of assemblies according to claim 29, characterized in that said removable engagement is formed with mechanical engaging parts of the male/female type.

32. An assembly resulting from a combination of predetermined number of modules according to claim 29, characterized in that it defines a means for a game activity or a furnishing accessory or a means for creating stage-set structures.

33. An assembly comprising:
   a plurality of a first type of module (1, 19, 28, 50, 52, 54) comprising at least an active magnetic element (2 and 3, 20, 33 and 34, 42, 47 and 48, 58) having two polar surfaces of opposite polarity, and at east one ferromagnetic element (6, 21 and 22, 30, 40, 44, 55),
   a plurality of a second type of module (15,37) consisting of one ferromagnetic element,
   wherein the assembly defines a magnetic circuit in which each of the modules of the first and of the second type defines at least two magnetically active areas, each of which can one magnetically anchored to a corresponding said magnetically active area of another module of the first or second type, so that the first and second types of modules can be chained together infinitely;
   wherein a magnetic flux generated by the active magnetic elements of the assembly (2 and 3, 20, 33 and 34, 42, 47 and 48, 58) is closed at least partially via said at least one ferromagnetic element (6, 21 and 22, 30, 40, 44, 55) of said modules of a first type of modules (1, 19, 28, 50, 52, 54) and via said one ferromagnetic element (15,37) of said modules of a second type of modules (15,37);
   wherein magnetic potential differences produced in said magnetic circuit by the active magnetic elements (2 and 3, 20, 33 and 34, 42, 47 and 48, 58) involved in anchorage of said modules of a first (1, 19, 28, 50, 52, 54) and second (15,37) type of modules are connected together in series via said at least one ferromagnetic element of said first type of modules and via said one ferromagnetic element of said modules of the second type; and
   wherein the modules of the assembly are assembled so that said magnetic circuit provides the best magnetomotive force/magnetic reluctance ratio.

* * * * *

UNITED STATES PATENT AND TRADEMARK OFFICE
CERTIFICATE OF CORRECTION

PATENT NO. : 6,566,992 B1  Page 1 of 1
DATED : May 20, 2003
INVENTOR(S) : Claudio Vicentelli It is certified that error appears in the above-identified patent and that said Letters Patent is hereby corrected as shown below:

Title page,
Item [56], References Cited, FOREIGN PATENT DOCUMENTS,
"EP 56112705 9/1981" should read -- JP 56112705 9/1981 --

Signed and Sealed this

Tenth Day of February, 2004

JON W. DUDAS
*Acting Director of the United States Patent and Trademark Office*

US006566992C1

(12) EX PARTE REEXAMINATION CERTIFICATE (6987th)
United States Patent
Vicentelli

(10) Number: US 6,566,992 C1
(45) Certificate Issued: Aug. 11, 2009

(54) MODULES CREATING MAGNETIC ANCHORAGE ASSEMBLIES AND RELEVANT ASSEMBLIES

(76) Inventor: Claudio Vicentelli, Località la Scaletta, 07041 Alghero, Sassari (IT)

Reexamination Request:
No. 90/007,146, Jul. 30, 2004

Reexamination Certificate for:
Patent No.: 6,566,992
Issued: May 20, 2003
Appl. No.: 09/700,761
Filed: Nov. 20, 2000

Certificate of Correction issued Feb. 10, 2004.

(22) PCT Filed: Mar. 24, 1999

(86) PCT No.: PCT/EP99/02040
§ 371 (c)(1),
(2), (4) Date: Nov. 20, 2000

(87) PCT Pub. No.: WO99/60583
PCT Pub. Date: Nov. 25, 1999

(30) Foreign Application Priority Data
May 20, 1998 (IT) .......................... MI98A1109

(51) Int. Cl.
*G09B 1/38* (2006.01)
*G09B 23/04* (2006.01)
*G09B 23/26* (2006.01)
*G09B 1/00* (2006.01)
*H01F 7/02* (2006.01)

(52) U.S. Cl. .............. 335/306; 335/285; 335/286; 335/296

(58) Field of Classification Search ......... 335/285–286, 335/296–306; 273/239, 290; 446/85, 92
See application file for complete search history.

(56) References Cited

U.S. PATENT DOCUMENTS

| 1,236,234 | A | * | 8/1917 | Troje ........................... 446/92 |
| 2,795,893 | A | | 6/1957 | Vayo |
| 2,970,388 | A | * | 2/1961 | Yonkers ..................... 434/277 |
| 3,077,696 | A | | 2/1963 | Barnett et al. |
| 3,906,658 | A | | 9/1975 | Gross |
| 4,238,905 | A | * | 12/1980 | MacGraw, II ................ 446/92 |
| 4,356,467 | A | | 10/1982 | Cardone et al. |
| 4,462,596 | A | * | 7/1984 | Yamamoto .................. 273/239 |
| 5,684,352 | A | | 11/1997 | Mita et al. |

FOREIGN PATENT DOCUMENTS

| JP | 47-034196 | 1/1973 |
| JP | 48-087510 | 11/1973 |
| JP | 51-130138 | 11/1976 |
| JP | 54-132574 | 10/1979 |
| JP | 56-112705 | 9/1981 |
| JP | 61-034903 | 2/1986 |
| SU | 1186230 | 10/1985 |

OTHER PUBLICATIONS

Welcome to the World of Roger's Connection, Dec. 16, 1996, http://web:archive.org/web/19970106020747/rogersconnection.com/index.html.

McGraw–Hill Encyclopedia of Science & Technology, 6th Edition, 1987, "Magnetic circuits", pp. 283–284.

(Continued)

*Primary Examiner*—Pia Tibbits

(57) ABSTRACT

A module (1, 16, 19, 28, 50, 52, 54, 100) for the creation of assemblies comprising at one active magnetic element of attraction (2, 3, 17, 23, 33, 34, 42, 47, 48) and a least one ferromagnetic element (6, 21, 22, 30, 40, 44) suitable for defining areas (13, 14, 35, 36, 88, 90, 80, 82, 110, 10, 250, 260, 92, 94) for connection to other modules, with it is possible to create an assembly of modules (1, 16, 19, 28, 50, 52, 54, 100, 37, 15) which provides a magnetic circuit which closes totally or at least partially via the ferromagnetic elements present (6, 21 22, 30, 40, 44, 55, 104, 37, 15).

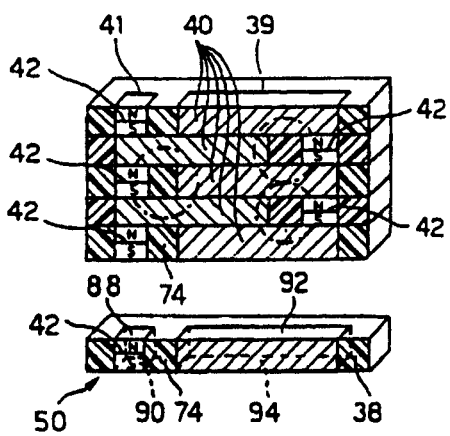

OTHER PUBLICATIONS

Grant & Hackh's Chemical Dictionary, Fifth Edition, 1987, the abbreviation of PP on p. 469 and the definition of steel on p. 553.

Konetic catalog of available products, "1995 January Magnetic Collection", Jan. 1995.

* cited by examiner

US 6,566,992 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8, 9, 15, 25, 26 and 28–33 are cancelled.

Claims 1–7, 10–14, 16–24 and 27 are determined to be patentable as amended.

New claims 34 and 35 are added and determined to be patentable.

1. An assembly comprising:
   a plurality of a first type of modules [(1, 19, 28, 50, 52, 54)], each of said first type of [nodules] *modules* (1, 19, 28, 50, 52, 54) comprising at least one active magnetic element [(2 and 3, 20, 33 and 34, 42, 47 and 48, 58)] having two polar surfaces of opposite polarity, and at least one ferromagnetic element [(6, 21 and 22, 30, 40, 44, 55)], *the at least one active magnetic element and the ferromagnetic element of each said first type of module being arranged to define at least two magnetically active areas, each of which can be magnetically anchored* [co] *to* a corresponding said magnetically active area of another said first type of module, so that a plurality of said first types of modules can be chained together infinitely, to construct [an] *a physical series* assembly defining a magnetic circuit;
   wherein a magnetic flux generated by the active magnetic elements in the *physical series* assembly is short circuited at least partially via said at least one ferromagnetic element [(6, 21 and 22, 30, 40, 44, 55)] *of each of the first type of module within said series magnetic circuit*;
   wherein the magnetic flux generated by the magnetic potential differences of *each of* the active magnetic elements [(2 and 3, 20, 33 and 34, 42, 47 and 48, 58)] in [a] *the physical* series [connection] *assembly* of said [modules of a] first type of modules [(1, 19, 28, 50, 52, 54) produces] *sums to produce* a series magnetic circuit extending through *an entirety of* the *physical* series [connection] *assembly* of said first type of modules; [and]
   wherein the first type of modules of the assembly are assembled so that said magnetic circuit provides the best magnetomotive force/magnetic reluctance ratio; *and*
   *wherein the ferromagnetic element and the active magnetic element of each said first type module are arranged in series to have opposite facing surfaces in contact with one another, and to define the magnetically active areas at distal ends of the first type of module.*

2. [A module of a first type of modules (1, 28, 50, 52, 54) comprising at least one active magnetic element (2 and 3, 33 and 34, 42, 47 and 48, 58), that is an element having two polar surfaces of opposite polarity, and at least one ferromagnetic element (6, 30, 40, 44, 55) for an] *The* assembly according to claim [21] *1*, [characterized in that it] *wherein* each said first type of module has an elongated structure along which said at least [an] *one said* active magnetic element [(2 and 3, 33 and 34, 42, 47 and 48, 58)] and said at least one ferromagnetic element [(6, 30, 40, 44, 55)] are arranged[, and in that it defines] *to define the* at least two magnetically active areas whereto corresponding modules of the assembly can be anchored.

3. [A module of a first type of modules] *The assembly* according to claim 2, [characterized in that] *wherein for each said first type of module, each of* said at least two magnetically active areas [(35, 36) are all provided by] *lies on a surface of a respective one of* said at least one active magnetic element [(33, 34)].

4. [A module of a first type of modules] *The assembly* according to claim 2, [characterized in that] *wherein for each said first type of module,* said at least two magnetically active areas [(250, 260) are all provided by] *lie on a surface of* said at least one ferromagnetic element [(21, 22)].

5. [A module of a first type of modules] *The assembly* according to claim 2, [characterized in that a part (88, 90)] *wherein for each said first type of module, one* of said at least two magnetically active areas [is provided by] *lies on a surface of* said at least one active magnetic element [(42)], and [a part (92, 94) by] *another of the at least two magnetically active areas lies on a surface of* said at least one ferromagnetic element [(40)].

6. [A module] *The assembly* according to claim 2, [characterized in that it] *wherein the first type of module consists* of one *said* ferromagnetic element in the form of an elongated cylindrical ferromagnetic yoke [(6, 30)] and of two active magnetic elements in the form of an upper cylindrical magnet, [(2, 33)] and a lower cylindrical magnet [(3, 34)], said upper magnet [(2, 33)] and lower magnet [(3, 34)] being connected in series by the interposition of said cylindrical yoke [(6, 30)].

7. [A module] *The assembly* according to claim 6, [characterized in that] *wherein* at the upper and lower bases of said yoke [(6)] an upper [(4)] and respectively lower [(5)] slot is formed for housing said upper [(2)] and respectively lower [(3)] magnets, the lateral walls of said upper [(4)] and lower [(5)] slots being provided distanced from the lateral walls of said upper [(2)] and respectively lower [(3)] magnets.

10. [A module] *The assembly* according to claim 2, [characterized in that it] *wherein the first type of module consists* of one ferromagnetic element in the form of a substantially rectangular ferromagnetic bar [(44)] and of two magnetic active elements in form of a first [(47)] and a second [(48)] substantially rectangular magnet polarized perpendicularly to the longitudinal extension of the module and arranged with opposite polarization above the opposite ends of the ferromagnetic element [(44)] in order to be connected in series via said ferromagnetic element [(44)].

11. [A module] *The assembly* according to claim 2, [characterized in that it] *wherein the first type of module consists* of one ferromagnetic element in form of an elongated ferromagnetic integration unit [(55)] and of a plurality of magnetic active elements in form of a plurality of longitudinally aligned magnets [(58)] inserted in *a corresponding* housing [(56)] provided along the length of said integration unit [(55)], said plurality of longitudinally aligned magnets [(58)] being polarized perpendicularly to the longitudinal axis of the elongated ferromagnetic integration unit [(55)].

12. [A module] *The assembly* according to claim 2, [characterized in that] *wherein* a removable engagement is provided between said at least one magnetic active element [(2 and 3, 33 and 34, 42, 47 and 48, 58)] and said at least one ferromagnetic element [(6, 30, 40, 44, 55)].

13. [A module] *The assembly* according to claim 12, [characterized in that] *wherein* a removable engagement is further provided between said at least one ferromagnetic element [(6, 30, 40, 44, 55)] and a non magnetic matrix [(7, 29, 74, 76, 106)] wherein said at least one active magnetic element [(2 and 3, 33 and 34, 42, 47 and 48, 58)] and said at least one ferromagnetic element [(6, 30, 40, 44, 55)] are inserted.

14. [A module for the creation of assemblies] *The assembly* according to claim 12, [characterized in that] *wherein* said removable engagement is formed with mechanical engaging parts of the male/female type.

16. [A module of a second type of modules (15, 37) consisting of one ferromagnetic element (15, 37) for an assembly] *The assembly* according to claim 1, [characterized in that] *wherein* said one ferromagnetic element is a sphere [(15, 37)].

17. An assembly comprising:
  a plurality of a first type of module [(1, 19, 28, 50, 52, 54)] comprising at least an active magnetic element [(2 and 3, 20, 33 and 34, 42, 47 and 48, 58)] having two polar surfaces of opposite polarity, and at least one ferromagnetic element [(6, 21 and 22, 30, 40, 44, 55)],
  a plurality of a second type of module [(15, 37)] consisting of one ferromagnetic element inserted in a non magnetic covering matrix,
  wherein the assembly defines a magnetic circuit in which each of the modules of the first and of the second type defines at least two magnetically active areas, each of which can be magnetically anchored to a corresponding said magnetically active area of another module of the first or second type, so that the first and second types of modules can be chained together infinitely *to form a physical series arrangement defining at least one series magnetic circuit*;
  wherein the magnetic flux generated by the active magnetic elements of the [assembly (2 and 3, 20, 33 and 34, 42, 47 and 48, 58)] *physical series arrangement* is closed at least partially via said at least one ferromagnetic element [(6, 21 and 22, 30, 40, 44, 55)] of *each of* said [modules of a] first type of modules [(1, 19, 28, 50, 52, 54)] and via said one ferromagnetic element [(15, 37)] of *each of* said [modules of a] second type of modules [(15, 37)] *within the series magnetic circuit*;
  wherein magnetic potential differences produced in said magnetic circuit by *each of* the active magnetic elements [(2 and 3, 20, 33 and 34, 42, 47 and 48, 58)] involved in anchorage of said modules of a] *in the first type of modules in the physical series arrangement sums to produces a series magnetic circuit extending through an entirety of the physical series arrangement of the* first [(1, 19, 28, 50, 52, 54)] and second [(15,37)] type] *types* of modules [are] connected together in series [via said at least one ferromagnetic element of said first type of modules and via said one ferromagnetic element of said modules of the second type]; and
  wherein the modules of the assembly are assembled so that said magnetic circuit provides the best magnetomotive force/magnetic reluctance ratio;
  *wherein the ferromagnetic element and the active magnetic element of each said first type module are arranged in series to have opposite facing surfaces in contact with one another, and to define the magnetically active areas at distal ends of the first type of module.*

18. [A module of a second type of modules (15,37) consisting of one ferromagnetic element (15,37) for an] *The* assembly according to claim 17, [characterized in that] *wherein* said one ferromagnetic element *of the second type of module* is a sphere [(15, 37)].

19. [A module of a] *The assembly of claim 17, wherein the* first type of [modules (1, 28, 50, 52, 54) comprising at least one active magnetic element (2 and 3, 33 and 34, 42, 47 and 48, 58), that is an element having two polar surfaces of opposite polarity, and at least one ferromagnetic element (6, 30, 40, 44, 55) for an assembly according to claim 22, characterized in that it] *module* has an elongated structure along which said at least [an] *one* active magnetic element [(2 and 3, 33 and 34, 42, 47 and 48, 58)] and said at least one ferromagnetic element [(6, 30, 40, 44, 55)] are arranged, and in that it defines at least two magnetically active areas whereto corresponding *said* modules of the assembly can be anchored.

20. [A module of a first type of modules] *The assembly* according to claim 19, [characterized in that] *wherein for each said first type of module, each of* said at least two magnetically active areas [(35, 36) are all provided by] *lies on a surface of* said at least one active magnetic element [(33, 34)].

21. [A module of a first type of modules] *The assembly* according to claim 19, [characterized in that saved] *wherein for each said first type of module, said* at least two magnetically active areas [(250, 260) are all provided by] *lie on a surface of* said at least one ferromagnetic element [(21, 22)].

22. [A module of a first type of modules] *The assembly* according to claim 19, [characterized in that a part (88, 90)] *wherein for each said first type of module, one* of said at least two magnetically active areas [is provided by] *lies on a surface of* said at least one active magnetic element [(42)], and [a part (92, 94) by] *another of the at least two magnetically active areas lies on* said at least one ferromagnetic element [(40)].

23. [A module] *The assembly* according to claim 19, [characterized in that it] *wherein each said first type of module* consists of one ferromagnetic element in the form of an elongated cylindrical ferromagnetic yoke [(6, 30)] and of two active magnetic elements in the form of an upper cylindrical magnet [(2, 33)] and a lower cylindrical magnet [(3, 34)], said upper magnet [(2, 33)] and lower magnet [(3, 34)] being connected in series by the interposition of said cylindrical yoke [(6, 30)].

24. [A module] *The assembly* according to claim 23, [characterized in that] *wherein for each said first type of module,* at the upper and lower bases of said yoke [(6)] an upper [(4)] and respectively lower [(5)] slot is formed for housing said upper [(2)] and respectively lower [(3)] magnets, the lateral walls of said upper [(4)] and lower [(5)] slots being provided distanced from the lateral walls of said upper [(2)] and respectively lower [(3)] magnets.

27. [A module] *The assembly* according to claim 19, [characterized in that it] *wherein the first type of module* consists of one ferromagnetic element in the form of a substantially rectangular ferromagnetic bar [(44)] and of two magnetic active elements in the form of a first [(47)] and a second [(48)] substantially rectangular magnet polarized perpendicularly to the longitudinal extension of the module and arranged with opposite polarization above the opposite ends of the ferromagnetic element [(44)] in order to be connected in series via said ferromagnetic element [(44)].

34. *The assembly of claim 1, wherein the magnetic series circuit extends through the magnetically active areas in each said first type of module in the physical series arrangement.*

35. *The assembly of claim 17, wherein the magnetic series circuit extends through the magnetically active areas in each said first type of module in the physical series arrangement.*

\* \* \* \* \*